US008464293B2

(12) United States Patent
Carr et al.

(10) Patent No.: US 8,464,293 B2
(45) Date of Patent: Jun. 11, 2013

(54) SYSTEMS AND METHODS FOR SELECTING MEDIA ASSETS FOR DISPLAY IN A SCREEN OF AN INTERACTIVE MEDIA GUIDANCE APPLICATION

(75) Inventors: Steven Carr, Wayne, PA (US); Charles White, Glen Mills, PA (US); Gerard Kunkel, Yardley, PA (US); Kyle Aaron, Philadelphia, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 292 days.

(21) Appl. No.: 12/347,481

(22) Filed: Dec. 31, 2008

(65) Prior Publication Data
US 2009/0178083 A1 Jul. 9, 2009

Related U.S. Application Data

(60) Provisional application No. 61/010,050, filed on Jan. 4, 2008.

(51) Int. Cl.
*G06F 3/00* (2006.01)
(52) U.S. Cl.
USPC .................. 725/47; 725/44; 725/45; 725/46; 725/61
(58) Field of Classification Search
None
See application file for complete search history.

(56) References Cited

U.S. PATENT DOCUMENTS

| | | | |
|---|---|---|---|
| 5,027,400 A | 6/1991 | Baji et al. | |
| 5,038,211 A | 8/1991 | Hallenbeck | |
| 5,133,081 A | 7/1992 | Mayo | |
| 5,223,924 A | 6/1993 | Strubbe | |
| 5,231,493 A | 7/1993 | Apitz | |
| 5,283,639 A | 2/1994 | Esch et al. | |
| 5,311,423 A | 5/1994 | Clark | |
| 5,353,121 A | 10/1994 | Young et al. | |
| 5,357,276 A | 10/1994 | Banker et al. | |
| 5,404,505 A | 4/1995 | Levinson | |
| 5,412,720 A | 5/1995 | Hoarty | |
| 5,428,789 A | 6/1995 | Waldron, III | |
| 5,559,548 A | 9/1996 | Davis et al. | |
| 2003/0093803 A1* | 5/2003 | Ishikawa et al. | 725/94 |

(Continued)

FOREIGN PATENT DOCUMENTS

| | | |
|---|---|---|
| DE | 3246225 | 6/1984 |
| EP | 1 947 849 | 11/2010 |
| FR | 2662895 | 12/1991 |
| GB | 2129649 | 5/1984 |
| JP | 6217271 | 8/1994 |

(Continued)

OTHER PUBLICATIONS

Antonofs, M., "Stay Tuned for Smart TV," Popular Science, Nov. 1990, pp. 62-65.

(Continued)

*Primary Examiner* — Cai Chen
(74) *Attorney, Agent, or Firm* — Ropes & Gray LLP

(57) ABSTRACT

A method and system of selecting assets for display in an interactive media guidance application includes receiving a user input indicating interest in a media item; generating a list of media assets related to the media item, selecting, based on priority rules, a subset of the media assets to display in an interactive media guidance application, and displaying an identifier for each of the subset of media assets in the interactive media guidance application screen. The priority rules may assign a first priority to one type of media asset and a second priority to a second type of media asset, and may be based on: whether the media asset has been viewed, and a respective time associated with the media asset.

24 Claims, 16 Drawing Sheets

U.S. PATENT DOCUMENTS

| | | | |
|---|---|---|---|
| 2004/0216158 A1* | 10/2004 | Blas | 725/46 |
| 2005/0071871 A1 | 3/2005 | Yuzawa | |
| 2005/0160461 A1 | 7/2005 | Baumgartner et al. | |
| 2006/0161952 A1* | 7/2006 | Herz et al. | 725/46 |
| 2006/0248558 A1 | 11/2006 | Barton et al. | |
| 2007/0204299 A1* | 8/2007 | Vosseller | 725/46 |
| 2007/0271296 A1 | 11/2007 | Purang et al. | |
| 2008/0066106 A1* | 3/2008 | Ellis et al. | 725/40 |

FOREIGN PATENT DOCUMENTS

| | | |
|---|---|---|
| JP | 2002/218369 | 8/2002 |
| JP | 2005-064832 | 3/2005 |
| WO | WO9100670 | 1/1991 |
| WO | WO9119391 | 12/1991 |
| WO | WO9204801 | 3/1992 |
| WO | WO 2006/043017 | 4/2006 |
| WO | WO-2007/043347 A1 | 4/2007 |

OTHER PUBLICATIONS

Brugliera, Vito, "Digital On-Screen Display—A New Technology for the Consumer Interface", Symposium Record Cable Sessions. Jun. 11, 1993, pp. 571-586.

Compuvid Sales Manual (date unknown).

Fassihi, Theresa & Bishop, Nancy, "Cable Guide Courting National Advertisers," Adweek, Aug. 8, 1988.

Manners, George, "Smart Screens; Development of Personal Navigation Systems for TV Viewers," Video Magazine, Dec. 1993.

Prevue Guide Brochure, Spring, 1994.

Robinson, G., and Loveless, W., "Touch-Tone' Teletext—A Combined Teletext-Viewdata System," IEEE Transactions on Consumer Electronics, vol. CE-25, No. 3, Jul. 1979, pp. 298-303.

Roizen, Joseph, "Teletext in the USA," SMPTE Journal, Jul. 1981, pp. 602-610. . Advertisement for "TV Decision," CableVision, Aug. 4, 1986.

Tanton, N. E., "UK Teletext—Evolution and Potential," IEEE Transactions on Consumer Electronics, vol. CE-25, No. 3, Jul. 1979, pp. 246-250.

TV Communications Advertisement for MSI Datacasting Systems, Jan. 1973.

Advertisement for "TV Decision", Cablevision, Aug. 4, 1986.

International Search Report and Written Opinion for PCT/US2008/014136 dated Jul. 4, 2009.

* cited by examiner

What's New

See new recordings, watchlist programs and recommended shows.

My TV

What's New
My DVR +
Favorite Channels +
Watchlist
Top Picks +
On Demand History

New Recordings
- The Office  2:00 PM | 6 ABC
- Daily Show with... 30 min | DVR
- Gladiator 155 min | DVR

Watchlist
- Law and Order  2:00 PM | 43 TNT
- Mythbusters  Wed 9:00 PM | 18 DSC
- Man vs. Wild  Wed 10 PM | 18 DSC
- Kathy Griffith: My... Thu 2:00 PM | 59 BRAV

Best Bets
Greek
Friday 8:00 PM
6 ABC

New, "Haze Phase"
Follows the social minefield of the greek systems at...

420

400

A Sort/Filter  B Find it  C Interact   8:05 PM

What's New
Here are your alerts for your newest Recordings, Watchlist items, Favorites channels and Reminders

| What's New |
| My DVR + |
| Favorite Channels + |
| Watchlist |
| Top Picks + |
| On Demand History |

My Daily Alerts, 8/24

Law and Order
2:00 PM | 43 TNT

Mythbusters
Wed 9:00 PM | 18 DSC

PGA Classics
60 Min

Kathy Griffith: My...
On Now | 59 BRAV

Best Bets

Greek
Follows the social minefield of the greek systems at Cyprus-Rhodes University...
Today, 8:00 PM | 10 NBC The Cleaner
Inspired by a true story, Banks suffers from his own addictions, but after...
Today, 10:00 PM | 22 AETV △ Sort/Filter  Ⓑ Find it  Ⓒ Interact    8:05 PM

FIG. 6

SYSTEMS AND METHODS FOR SELECTING MEDIA ASSETS FOR DISPLAY IN A SCREEN OF AN INTERACTIVE MEDIA GUIDANCE APPLICATION

CROSS REFERENCE TO RELATED APPLICATIONS

This application claims the benefit of U.S. Provisional Patent Application No. 61/010,050, filed Jan. 4, 2008, titled "Interactive Television Program Guides," the entire contents of which are herein incorporated by reference.

BACKGROUND OF THE INVENTION

The invention is directed to systems and methods for selecting media assets for display in a screen of an interactive media guidance application.

In a conventional interactive media guidance application, a user may view a screen or other display that includes information about available media. Some conventional interactive media guidance applications may include a feature for recommending content for a user. However, relevance engines and personalization systems can often provide a great number of suggested or relevant results. Depending on the type of user equipment and available display area, navigation of a long list of results could be unwieldy.

Accordingly, it is desired to provide enhanced systems and methods for selecting and grouping media assets for display in an interactive media guidance application.

SUMMARY OF THE INVENTION

An interactive media guidance application according to embodiments of the invention is described herein and is designed to provide, among other things, an interface for accessing media assets that is capable of displaying in a screen, certain selected and grouped media assets.

One embodiment of the invention is directed to a method and system of selecting assets for display in an interactive media guidance application, that comprises receiving a user input indicating an interest in a media item, generating a list of media assets related to the media item, wherein the list of media assets comprises at least an on-demand media asset and a recorded media asset; and selecting, based on priority rules, a subset of the media assets to display in an interactive media guidance application, wherein the priority rules assign a first priority to the on-demand media asset, and a second priority to the recorded media asset, and wherein the priority rules are based at least in part on: (1) whether the media asset has been viewed, and (2) a respective time associated with the media asset; and displaying an identifier for each of the subset of media assets in the interactive media guidance application screen. User input may comprise, for example, tagging or user viewing history information. Some examples of media items may include characteristics or search terms, such as: actors, music groups, sports teams, movies, programs, celebrities, directors, individuals or other items.

In some embodiments of the invention the subset of media assets is displayed in an order determined by the priority rules. The priority rules may be further based, in part, on at least one of the group of: a user preference, a user history, a user device type, a priority order for an asset type, and episode catch-up.

In some embodiments, some of the subset of media assets may be selected for display based on an available area in the interactive media guidance application screen. The subset of media assets may be logically grouped by a category for display in the interactive media guidance application screen.

For embodiments of the invention, generally, the media assets may comprise one of the group of: new recordings, old recordings, recent associated content, on demand content, episode catch-up, next new episode, viewed content, photographs, music content, games, next game, missed games, linear showings, extra scenes, interactive portals, shopping, music videos, music files, news, biographical information, and sports statistics.

In some embodiments of the invention, a subset of the media assets may be determined to be included in a user's service package. In some embodiments, an up sell option may be provided for any media assets that not included in the user's service package.

BRIEF DESCRIPTION OF THE DRAWINGS

The above and other features of the present invention, its nature and various advantages will be more apparent upon consideration of the following detailed description, taken in conjunction with the accompanying drawings in which:

FIGS. 3A-7 show illustrative personalized screens for an interactive television guidance application in accordance with embodiments of the present invention;

DETAILED DESCRIPTION

Figure 1:
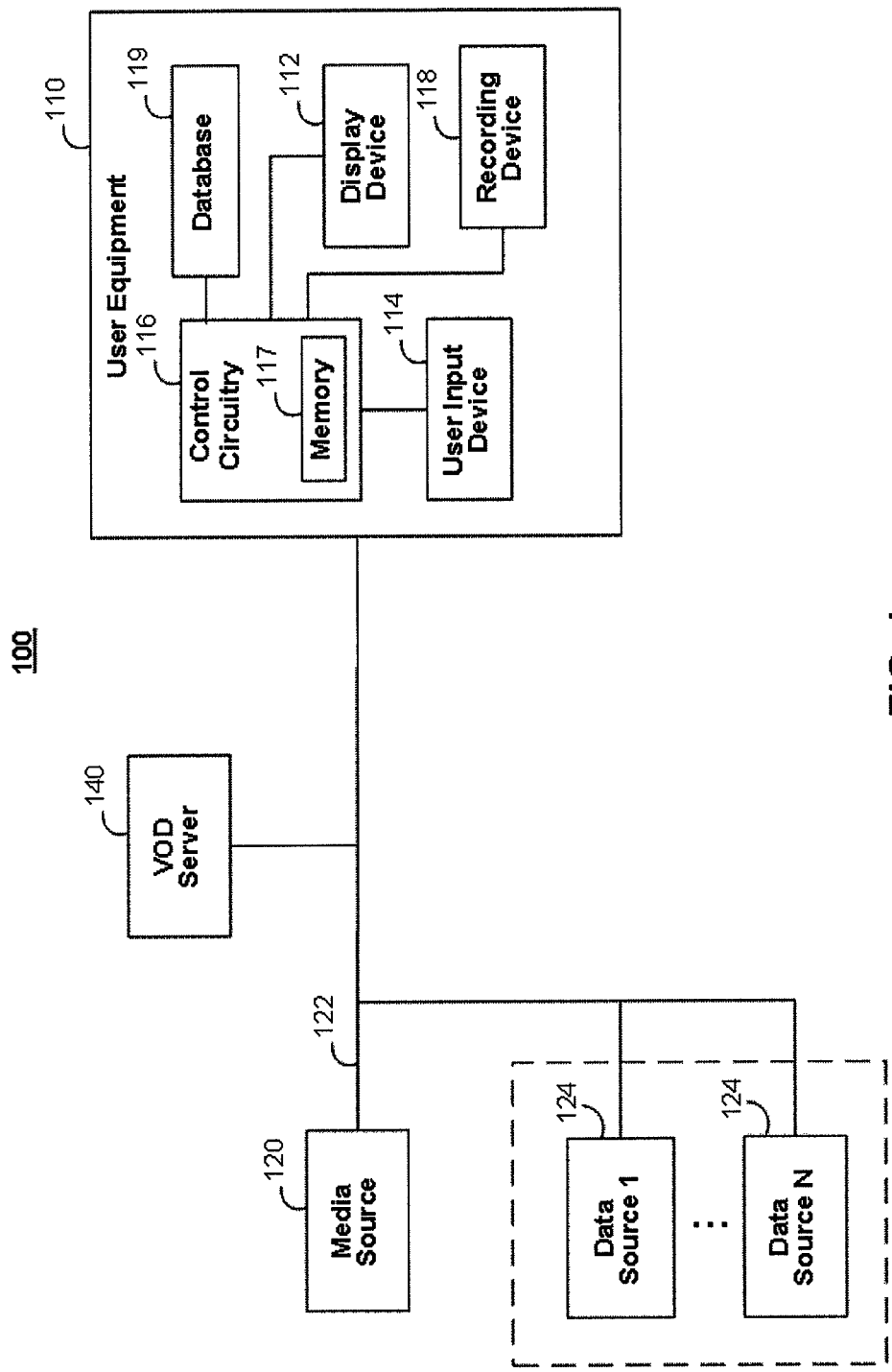
FIG. 1 is a diagram of an illustrative interactive television system in accordance with an embodiment of the present invention.

FIG. 1 shows an illustrative interactive media system 100 in accordance with one embodiment of the invention. User equipment 110 receives media in the form of signals from media source 120 over communications path 122. In practice there may be multiple media sources 120 and user equipment 110, but only one of each has been shown in FIG. 1 to avoid over-complicating the drawing.

Media source 120 may be any suitable media source such as, for example, a cable system head end, satellite media distribution facility, media broadcast facility, internet protocol television (IPTV) head end, on-demand server (e.g., VOD server), website, game service provider (e.g., for online gaming), switched digital video (SDV) system (e.g., comprising SDV manager, edge-resource manager, and edge-QAM subsystems) or any other suitable facility or system for originating or distributing media. Media source 120 may be configured to transmit signals over any suitable communications path 122 including, for example, a satellite path, a fiber-optic path, a cable path, an Internet path, or any other suitable wired or wireless path. The signals may carry any suitable media such as, for example, television programs, games, music, news, web services, video, or any other suitable media. In some embodiments, media source 120 may include control circuitry for executing requests from a trick-play client or an interactive media guidance application implemented in, for example, user equipment 110 or a VOD server.

User equipment 110 may include any equipment suitable for providing an interactive media experience. User equipment 110 may include television equipment such as a television, set-top box, recording device, video player, user input device, or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV). In some embodiments, user equipment 110 may include a home theatre consumer electronic device such as, for example, a gaming system (e.g., X-Box, PlayStation, or GameCube) or a portable consumer electronic device, such as a portable DVD player, a portable gaming device, a cellular telephone, a PDA, a music player (e.g., MP3 player), or any other suitable home theatre or portable device.

In the example of FIG. 1, user equipment 110 includes at least control circuitry 116, display device 112, and user input device 114 which may be implemented as a separate device or as a single device. User equipment 110 may optionally include recording device 118 which may be implemented as a separate device or as a single device. An interactive media guidance application may be implemented on user equipment 110 to provide media guidance functions to the user for media displayed on display device 112. In some embodiments, the interactive media guidance application may be or include an interactive television application, a trick-play client, or any other application for providing media features to the user.

Display device 112 may be any suitable device such as, for example, a television monitor, a computer monitor, or a display incorporated in user equipment 110 (e.g., a cellular telephone or portable music player display). Display device 112 displays the media transmitted by media source 120 over path 122, and the displays of the trick-play client. Display device 112 may also be configured to provide for the output of audio.

User input device 114 may be any suitable device for interfacing with the interactive media guidance application. For example, user input device 114 may be a remote control, keyboard, mouse, touch pad, touch screen or voice recognition interface. User input device 114 may communicate with user equipment 110 and control circuitry 116 using any suitable communications link. For example, user input device 114 may use an infra-red (IR), radio-frequency, Bluetooth, wireless (e.g., 802.11), wired, or any other suitable communications link. The information received by user input device 114 may either be classified as a source selection command or a guidance application navigation command. A source selection command may include a channel change selection, video on demand selection, digital video recorder selection, or any suitable selection that causes the user to view content different than the content the user is currently viewing. The content the user is currently viewing may be defined as content that is currently being displayed on the display device 112. A guidance application navigation command may include any suitable command that allows the user to change the information displayed in the interactive media guidance application.

Control circuitry 116 is adapted to receive user inputs from input device 114 and execute the instructions of the interactive media guidance application. Control circuitry 116 may include one or more tuners (e.g., analog or digital tuners), encoders and decoders (e.g., MPEG decoders), processors (e.g., Motorola 68000 family processors, or MIPS family processors), memory 117 (e.g., RAM and hard disks), communications circuitry (e.g., cable modem circuitry), input/output circuitry (e.g., graphics circuitry), connections to the various devices of user equipment 110, and any other suitable component for providing analog or digital media programming, program recording, and interactive media guidance features. In some embodiments, control circuitry 116 may be included as part of one of the devices of user equipment 110 such as, for example, part of display 112 or any other device (e.g., a set-top box, television and video player). Control circuitry 116 may also include advertisement selection circuitry to prevent the user from experiencing an episodic advertisement out of order. In some embodiments, memory 117 may store user viewing data that includes a user's history of viewing advertisements.

In some embodiments, control circuitry 116 may include a processor (e.g., a microcontroller or microprocessor) that receives and executes interactive media guidance application instructions. These instructions may perform various determinations to ensure that the user is not presented an advertisement of an episodic advertisement out of the correct order. Control circuitry 116 may include memory such as random-access memory for use when executing applications. Non-volatile memory may also be used to store a boot-up routine or other instructions. In other embodiments, interactive media guidance application instructions may be executed in other suitable stand alone hardware.

Recording device 118 may be a personal video recorder (PVR), digital video recorder (DVR), video cassette recorder (VCR), DVD-recorder, compact disc recorder, or any other suitable recording device or storage device. In some embodiments, recording device 118 may be a storage device for storing or recording content or data recorded or provided by other components of interactive media system 100 (e.g., a storage device for caching live television programs to enable trick play functions). Recording device 118 may include one or more tuners, and may be configured to cache media as the user receives it with user equipment 110 (e.g., cache the currently tuned channel) to provide trick-play functions for the user. In some embodiments, recording device 118 may include circuitry to determine which advertisements should be recorded using recording device 118.

A hard disk and other storage in recording device 118 may be used to support databases (e.g., a database of media guidance information for recorded programs, or a database of advertisement information for recorded or cached advertisements). A hard disk or other storage in recording device 118 may also be used to record media such as television programs or video-on-demand content or other content provided to recording device 118.

In some embodiments, recording device 118 may include IR communications circuitry or other suitable communications circuitry for communicating with a remote control (e.g., with user input device 114). Recording device 118 may also include dedicated buttons and a front-panel display. The front-panel display may, for example, be used to display the current channel to which the recording device is tuned.

In some embodiments, recording device 118 may be a network recording device that is located outside of user equipment 110. In some embodiments, the network recording device may be incorporated in content source 120 (e.g., at the head-end of a cable plant), data source 124, VOD server 140, user equipment 110 (e.g., as a second recording device, or a hard drive on a home computer), an Internet server (not shown), or any other suitable device. In some embodiments, the network recording device may be a standalone device (e.g., a commercial network recording device, or a DVR device in a home or neighborhood network). The network recording device may receive instructions to perform recordings from the interactive media guidance application implemented on any of a plurality of instances of user equipment 110.

In some embodiments, the interactive media guidance application may provide features to the user with a client/server approach. There may be one server for each instance of user equipment 110, one for multiple instances of user equipment 110, or a single server may serve as a proxy for each instance of user equipment 110.

Any suitable number of users may have equipment, such as user equipment 110, connected to media source 120, data sources 124 and advertisement generator 140. A single user may also have multiple instances of user equipment 110. But for the clarity of the figure, the equipment of only a single user is shown. The equipment of the plurality of users may be connected to media source 120, data sources 124 and advertisement generator 140 using a cable television network, a satellite television network, a local area network (LAN), a wireless network, the Internet (e.g., using a DOCSIS modem), or any other suitable means. In some embodiments, the equipment of the plurality of users may be connected to each other using any suitable means.

User equipment 110 may receive interactive media guidance application data from one or more data sources 124. Data sources 124 may provide data for a particular type of media or for a particular application. For example, one data source 124 may provide data for non-on-demand media (e.g., non-pay and pay-per-view programs), and another may provide data for on-demand media (e.g., VOD programs). Or, for example, a single data source may provide both of these types of data. For example, one data source 124 may provide data for an interactive media guidance application. Another data source 124 may, for example, provide data for another interactive application (e.g., a home shopping application, and real-time data such as sports scores, stock quotes, news data and weather data). In some embodiments, data sources 124 may provide data to the interactive media guidance application using a client/server approach. There may be one server per data source, one for all sources or, in some embodiments, a single server may communicate as a proxy between user equipment 110 and various data sources 124. In such embodiments, data source 124 may include control circuitry for executing the instructions of the online media guidance application. Data source 124 may provide guide data to the interactive media guidance application. In one embodiment, the guide data provided by data source 124 may be periodically downloaded in part (e.g., updated) or in whole to memory 117 of control circuitry 116. The guide data may include program listings, or any other suitable guide data.

In some embodiments, interactive media system 100 may also include video on demand (VOD) server 140. FIG. 1 shows media source 120, data sources 124, and VOD server 140 as separate elements. In practice, their functionality may be combined and provided from a single system at a single facility, or multiple systems at multiple facilities. For example, a separate data source 124 may be associated with each of a plurality of television broadcasters and may provide data that is specific to those broadcasters (e.g., advertisements for future programming of the broadcasters, or logo data for displaying broadcasters' logos in interactive media guidance application display screens).

FIGS. 2-13 depict embodiments of screens in an interactive media guidance application according to embodiments of the invention. Although FIGS. 2-13 depict television-related content, the methods and systems described herein may be applied to any type of media content, including, for example, audio, video, electronic books, photographs, and other media.

Figure 2:
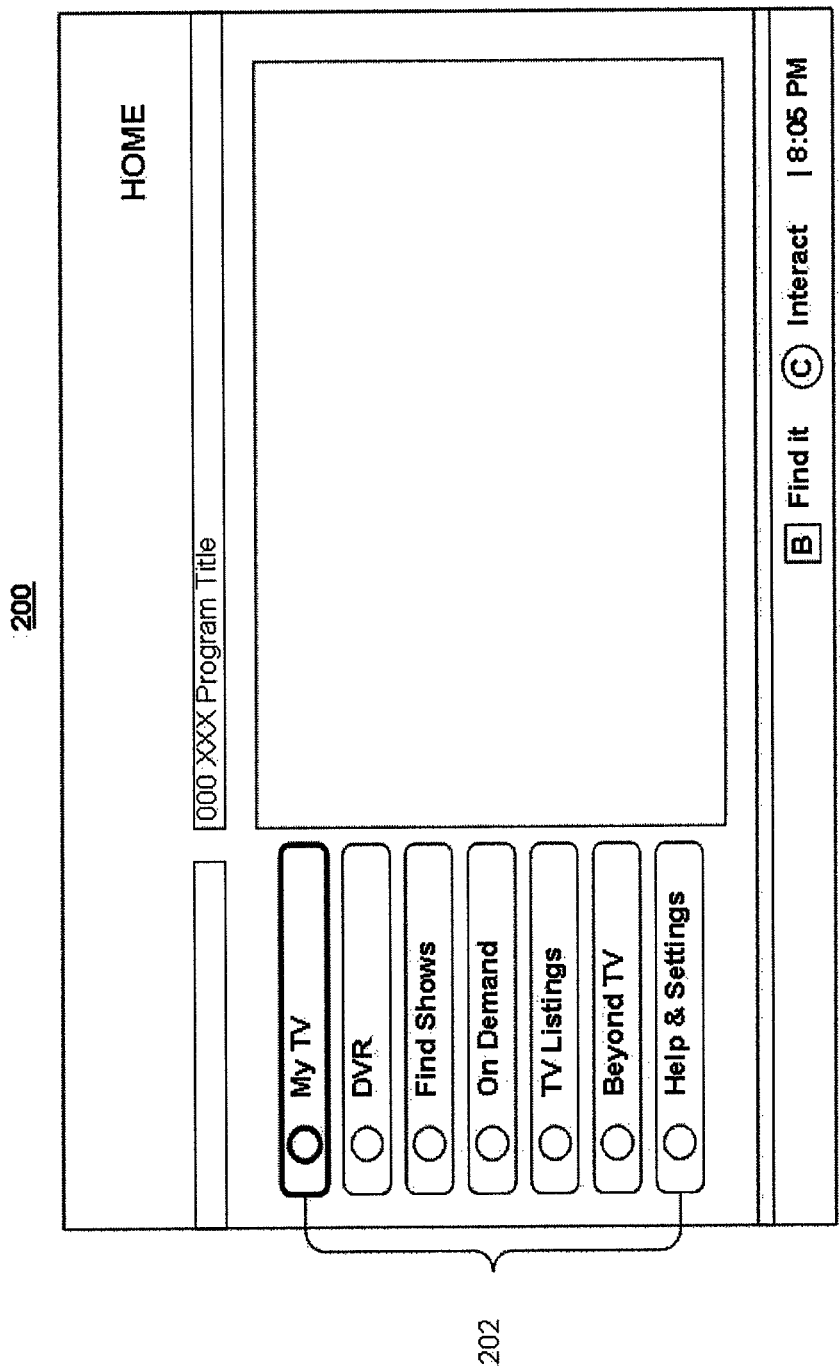
FIG. 2 shows an illustrative main home page screen for an interactive television guidance application in accordance with an embodiment of the present invention.

An illustrative main menu screen for an embodiment of a interactive media guidance application is shown in FIG. 2. As shown, the main menu screen 200 includes selectable links 202 for navigating the interactive media guidance application, for example: My TV, DVR, Find Shows, On Demand, TV Listings, Beyond TV, Help & Settings. Links 202 may be selected using one or more inputs via user input device 114, or other suitable technique, and provide screens that may include data received from data source 124, memory 117, database 119, or other information source. Selection of the link "My TV" may lead a user to a personalized guide screen, such as any of those depicted in FIGS. 3A-7, to be discussed in more detail herein. In some embodiments, log-in procedures may be required to view personalized My TV screens. In other embodiments, the My TV screen is specific to the user equipment 110, or other system component.

Selection of other links 202, such as "DVR" may cause the guide to display a screen for accessing information about items stored in or otherwise available for a DVR device or other local memory component. The link 202 for "Find Shows," when selected, typically leads to a screen for finding media content or assets, such as a television show or other program. A Find Shows screen may support conventional search features and functionality, and other known techniques for finding shows. In addition to shows, other types of media content may also be found in various embodiments similar to a Find Shows screen, such as videos, movies, music, photographs, writings, or other types of media assets. Selection of the link 202 for "On Demand" may cause display of a screen such as that illustrated in FIG. 8, which depicts several menus, links and other navigation features for finding and viewing On Demand content. Returning again to FIG. 2, other selectable links 202 include "TV Listings," for viewing a screen of television program listings, "Beyond TV," which, when selected, provides access to content other than television content, such as internet based content, locally stored content, music files, other digital files, or other content, and "Help & Settings" which, when selected provides guide help functions and options for guide settings, or other settings. In addition to the enumerated links 202, other selectable links may also be provided in main menu screen 200 for navigating the interactive media guidance application.

In some embodiments of an interactive media guidance application personalization is provided, as shown in My TV screens FIGS. 3A-7, in a Watchlist feature (depicted in FIGS. 3A-4 and 7). Various embodiments of the Watchlist may be provided, as shown in FIGS. 3A-4, 7 and 12-13, and typically include a list of one or more assets that a user has indicated that he or she is interested in viewing or consuming either explicitly (e.g., by tagging or adding to a watchlist) or implicitly (by setting a recording, reminder, or executing a search or persistent search for related content). In some embodiments, media items, or media assets may be added to a Watchlist via one or more user interfaces, such as by user selection in an interactive media guidance application of a link using user input device 114. More specifically, "add to Watchlist" link 812, 910, 1010 or 1110 depicted in FIGS. 8, 9, 10, and 11, respectively, or other interface may be selected to add a media item to a Watchlist. Other suitable techniques, such as tagging, (not shown) may also be used to add media items to the Watchlist. In some embodiments, items may be added to a Watchlist using one or more user inputs in user input device 114 to tag an identifier or other aspect associated with a specific media asset, such as a program title, genre, category, on-demand asset, program series, or other asset. In addition, keywords may also be tagged, such as an actor, artist, musician, celebrity, sports team, program series, sport, event, director, other individual, or other type of keyword that may be associated with a media item, causing a media asset to be added to a watchlist. Additionally, indirect actions, such as setting reminders or recordings for an asset, may also be used to add the asset to a watchlist.

In some embodiments, tagged media items or keywords may be stored as data in database 119 in association with a user's Watchlist. In some embodiments, users may view screens including a list of actual tagged items in a Watchlist, such as a list of keywords. In other embodiments, a Watchlist of assets may be generated based on the tagged items. In yet other embodiments, a user can view folders of Watchlist identified media assets that are associated with tagged items. For example, a user may view content by selecting, via user input device 114, a folder, or other selectable link in an interactive media guidance application to tagged Watchlist items that may include matched or associated content, such as music videos, movies, programs, recordings, program synopsis, news stories, video clips, or other information that may be related to the tagged keyword or Watchlist item that the user has selected.

In some embodiments various types of content or assets may be displayed and accessed via the interactive media guidance application. Although the application is mainly described in the context of television programming and television program guides, other types of assets may also be displayed and accessed using the methods and systems described herein. For example, photographs, music files, video files, text-based content, and other media may be obtained over the internet, from local storage (such as memory 117, recording device 118, or database 119), data source 124, or other sources may also be used. In such example, if the actor Steve Carell is tagged, a representative Watchlist could include the program The Office, upcoming episodes, past seasons, on-demand content, as well as biographical information, news articles, internet-based video, and other Steve Carell related media assets.

In some embodiments, media assets that are available to a user based on a subscription service may be packaged and displayed in interactive media guidance application screens using the methods described herein. In other embodiments, assets that are not included in a subscription service may be packaged for upselling to the user.

In some embodiments, selection of items or keywords to add to a Watchlist causes data related to such selection to be stored in memory 117 or other storage device. The stored Watchlist data, in particular keywords or other aspects that may indicate or be associated with more than one media asset, may be processed using control circuitry 116, or other processing component, to generate a Watchlist, such as those shown in FIGS. 3A-4, 7, and 12-13

Turning again to FIG. 3A, which depicts an illustrative My TV screen 300A, a personalized Watchlist 310 is presented, for example, upon selection of My Watchlist link 320. In some embodiments, the Watchlist 310 may provide a list of media assets of interest to a particular user. As shown in screen 300A, the Watchlist results 325 may be provided in a plurality of cells, each of which includes a grouping of identifiers for media assets 330. In general, the Watchlist 310 may include a plurality of results 325 which include an identifier for media assets 330, and in some embodiments, one or more other associated media assets 332. The underlying media asset and associated media asset that are represented by the identifier media asset 330 and identifier for associated media assets 332 may both be any type of media content, such as television program, games, video, bound or unbound OCAP applications, on demand content, recordings, music, photographs, text content, or other media. In some embodiments, associated media asset 332 may be the same as media asset 330, in other embodiments, asset 332 is different than, but associated with asset 330. For example, asset 332 may be a recording of an episode of a series asset 330. The Watchlist identifiers for media assets 330 may include, for example, television program titles, such as Lost, Dancing with Stars, or other programs. Other types of identifiers associated with a media asset may also be used. Although FIG. 3A only depicts television program media assets, other types of media assets may also be included in a user's Watchlist. For example, music files and videos, sports information, photographs, biographical information, games, interactive applications, and other types of media assets may also be included in a Watchlist.

Figure 3A:
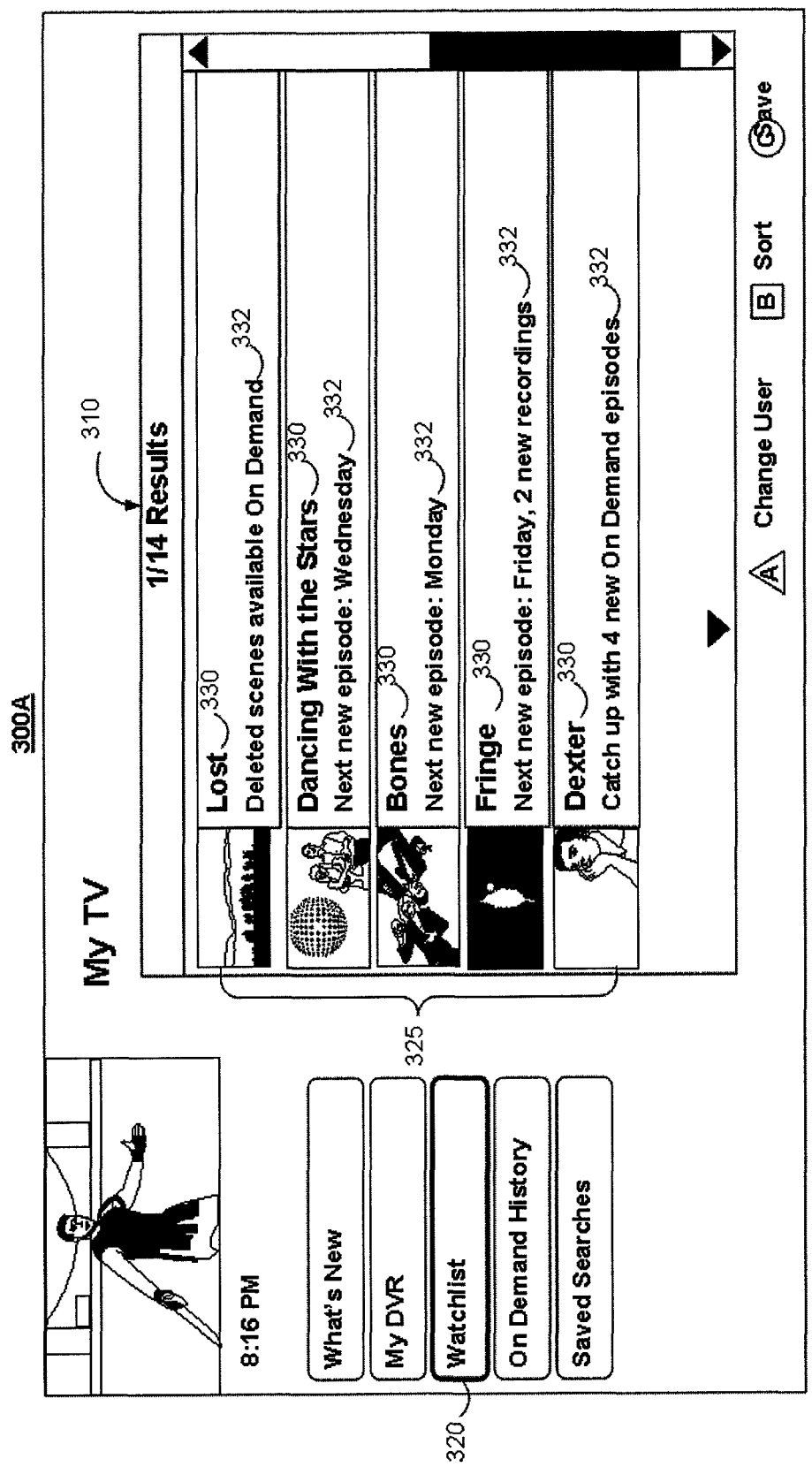

As shown in FIG. 3A, cells in the Watchlist results 310 may include grouped program specific content, or other associated assets 332. In general, the assets 330 and associated assets 332 are those that have been determined by the system to be of most importance or interest to a user. In some embodiments, user history or information may be used to personalize a results list 310, in other embodiments, priority rules, further described herein, are used to generate the results list 310. The identifiers for assets 330 and associated assets 332 may be provided in one or more cells that may be ranked in an order based on priority rules.

As illustrated in FIG. 3A, some of the types of identifiers of associated assets 332 are intended to inform the user of one or more assets associated with a program series. For example, some associated assets 332 include: available related content, an occurrence of a next new episode (including those that are soon to be broadcast or those that are new or unviewed by the user), new recordings of episodes of a series, and catch up episodes of a series that are available on-demand. For example, Lost 330 may be included in a Watchlist in a guide cell with an identifier for associated content 332 that identifies a deleted scene for one of the episodes of the series, the deleted scene available for on-demand viewing. In another example, the media asset 330 Fringe may be displayed in a cell with identifier 332 for associated content for a next new episode and new recordings. Another example is media asset Dexter 330 which is displayed in a cell with an identifier 332 for associated content for "catch-up with 4 new On Demand episodes." As would be understood by one skilled in the art, other rules for grouping media assets 330 and associated assets 332 may also be used, for example, all on-demand content could be grouped in a cell, all new recordings could be grouped in another cell, all content for a single channel may be grouped together, content from a particular source or genre may be grouped together, or other rules may be used for grouping assets.

Some of the associated assets 332 may be selected for display based on the user's viewing history or preferences. For example, the interactive media guidance application may determine that a user has missed, not viewed, or otherwise not consumed certain media. For example, control circuitry 116 may consult data from data source 124, in database 119, recording device 118, or memory 117 to determine any assets or keywords that may be tagged, or otherwise selected by a user, and that may have associated content that has not been partially or completely consumed by the user.

In response to such a determination, the guidance application may populate a cell with catch-up information using data from data source 124 received and processed by control circuitry 116. In another example, the guidance application may determine that there are certain unviewed recordings, based on data from data source 124, memory 117, recording device 118, and database 119, that may be received and processed by control circuitry 116, and indicate that to the user. Identifiers for assets 330 and associated assets 332 may be dynamically updated in cells in screen 300A in accordance with the user's viewing history or other actions.

In some embodiments, an identifier for catch-up content may be displayed in a selectable Watchlist link or cell. In other embodiments, a playlist of missed episodes or summary clips for missed episodes is provided. In some embodiments, partially viewed episodes are added to the playlist with an offset in the partially viewed episode that may allow the user to begin viewing at the point the user left off. Such details would be included in data stored in the recording device 118, memory 117, or database 119, or received from data source 124. In another embodiment, summaries (not shown) of missed episodes may also be provided in a catch-up playlist, the information for which may be provided by data source 124. Such a summary may be generated by control circuitry 116 based on program listing data received from data source 124 that may be associated with information indicating missed episodes that is stored in database 119.

Figure 9:
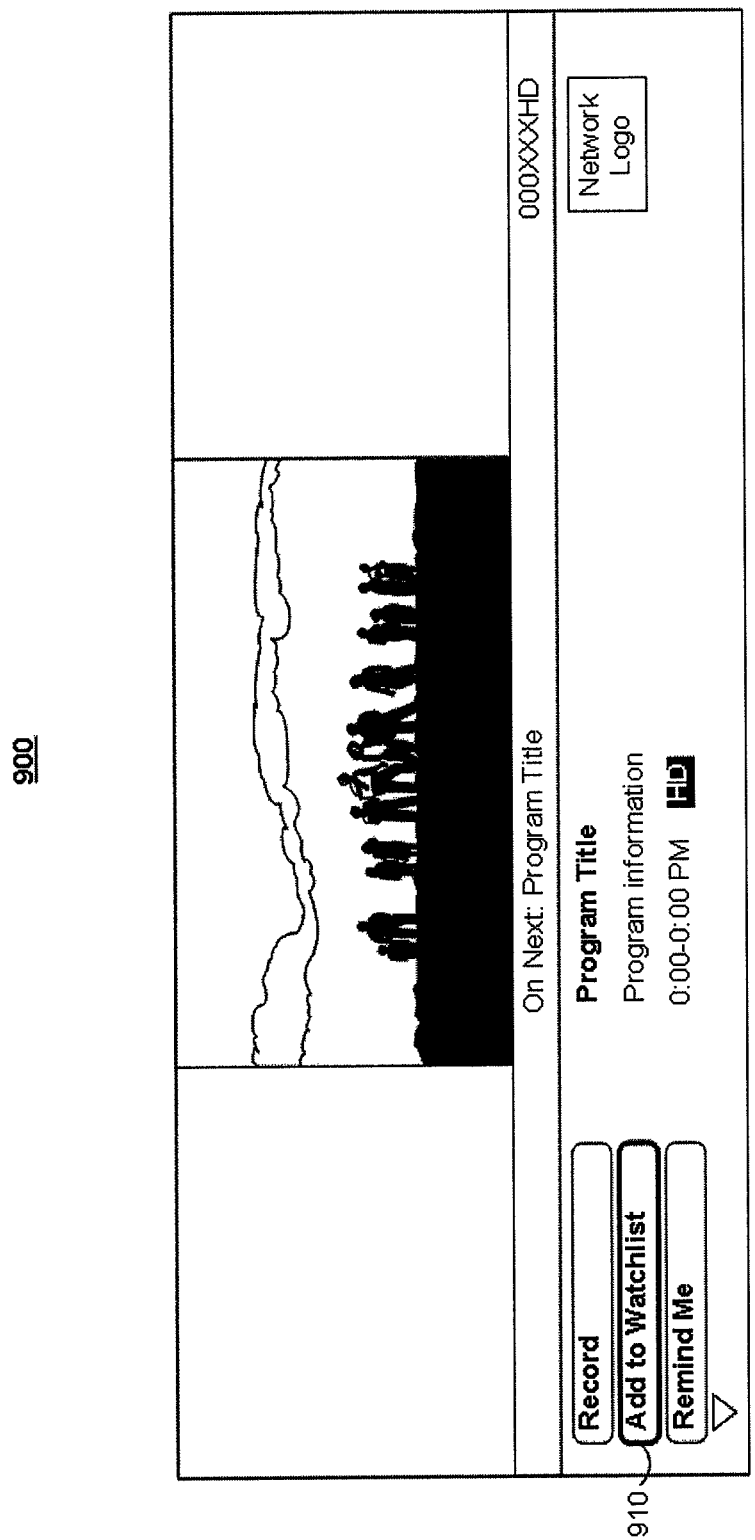
FIG. 9 shows an illustrative smart bar in an interactive television guidance application in accordance with an embodiment of the present invention.

As will be understood by one of skill in the art, each of the identifiers for media assets 330 and associated media asset 332 may be displayed as an interactive link, which may be selected, for example, using user input device 114, to view the media asset, either directly, or via one or more screens. In some embodiments, selecting an identifier for media assets 330 may cause a screen including program information (e.g., as depicted in FIG. 9) to be displayed, or lead to another screen from which the underlying media asset may be accessed. In other embodiments, selection of an interactive link for the identifier for media asset 330 or 332 in screen 300A may cause a media asset associated with the identifier 330 to be delivered to the user. For example, program data may be transmitted from VOD server 140, Media Source 120, Data Source 124, or other source, and delivered, e.g., via path 122 to user equipment 110 for viewing on display device 112.

The identifiers for assets 330 and associated assets 332 depicted in screen 300A may be selected from a larger group of content or media assets that may be relevant or of interest to a user. In some embodiments, priority rules for a type of asset 330 and 332 may define which assets to display in screen 300A. In addition, available area in screen 300A may also be a basis for selecting assets for display. For example, certain types of display devices 112 may have limited available screen area for an interactive media guidance application. More specifically, an interactive media guidance application screen displayed on a portable device with a small display screen may have limited area in comparison to a television or computer monitor. In addition, other screen components, such as advertisements, promotions, current program screen, or other components, may further limit available screen area.

As will be understood by one of skill in the art, various combinations of priority rules may be implemented for providing a Watchlist in a limited screen area. Some advantageous components of priority rules for selecting an asset for display in an interactive media guidance application may be based on a threshold for a time associated with an asset or type of asset, and whether an asset has been viewed or used. For example, an exemplary rule set for identifying and prioritizing associated media content for display in a Watchlist may include ranking the following types of content:

1. New recordings, if there are unwatched recordings less than 7 days old.
2. Most recent associated asset available On-Demand, if less than 14 days old and unwatched.
3. Next new episode if airing within 7 days.
4. Catch-up option if user has not watched all episodes.

If none of the above, then:

5. Older recordings.
6. New episodes airing more than 7 days later.
7. Assets already watched.

To the extent that media assets and associated media assets are identified and prioritized using the priority rules, the highest priority assets may be selected for a subgroup of media assets to display in an interactive media guidance application screen.

Figure 3B:
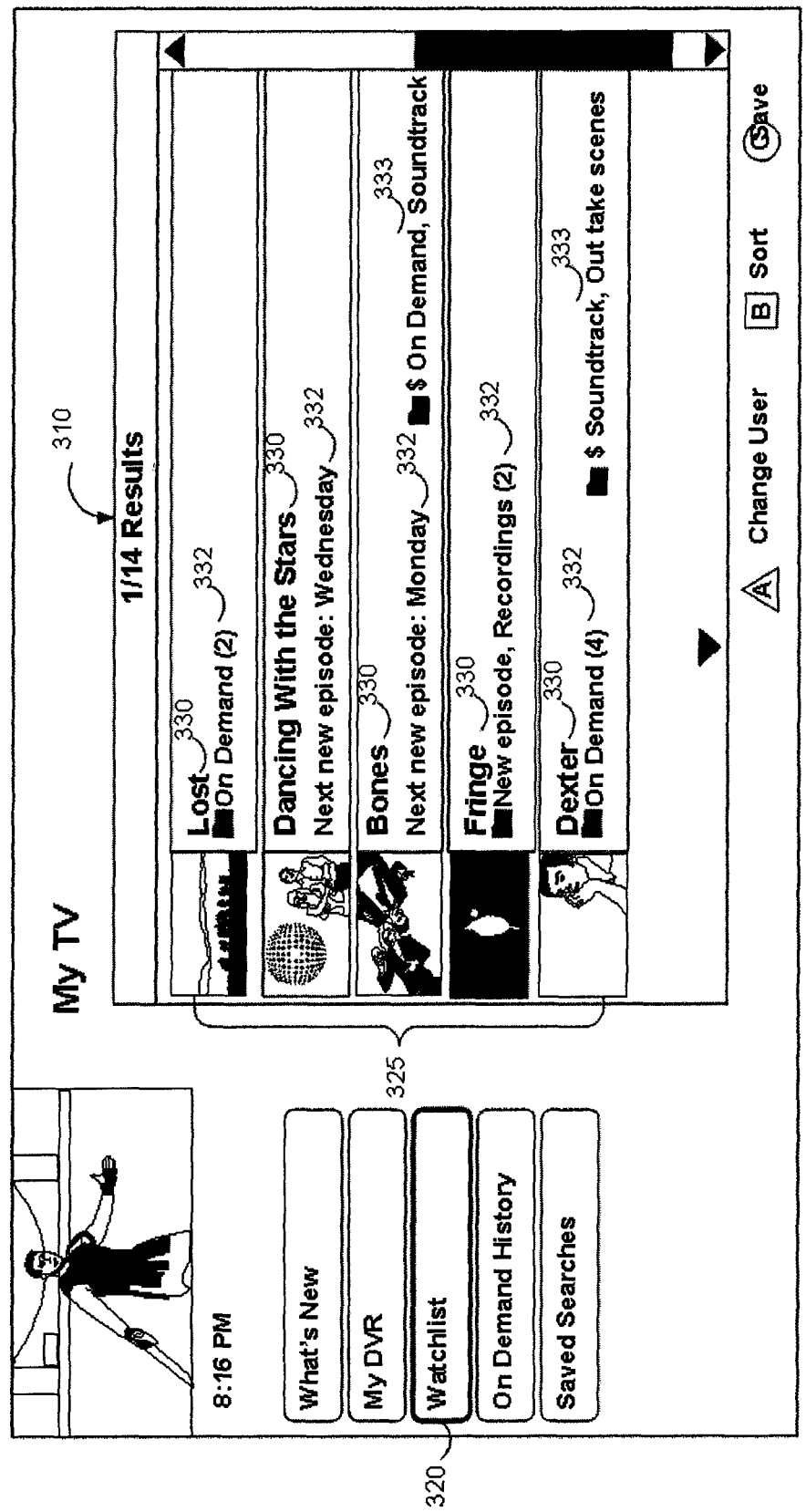

As discussed above, more than one embodiment of a Watchlist may be presented. In the embodiments depicted in FIGS. 3A and 3B, media assets 330 and associated media assets 332 are presented. FIG. 3B includes many elements in common with FIG. 3A and some additional elements. One of the additional elements is a folder icon for associated media assets 332 which may indicate that one or more media assets 332 are available for related media asset 330. As shown, for example, Lost 330 may have two items of associated media assets 332 in a related folder. Generally, when folder icons are presented, information indicating the contents of the folder is also displayed, such as media type and a number indicating the number of items in the folder. Folders of associated media assets 332 may be grouped in any suitable manner, for example using general to specific types of grouping categories such as same series, same type (e.g., recording or on-demand). In addition, folders may be used to indicate content that may be included in a user's subscription package. Items that are not in the user's subscription package may be packaged for upselling and may be identifiable using a symbol, such as the dollar sign shown for associated media assets 333 or shown with a greyed out icon or distinguished from subscribed assets in some other way.

In the embodiment depicted in FIG. 4, no grouping of media assets is provided in the Watchlist. Instead, each cell in the Watchlist in FIG. 4 includes a single media asset and related information. Other information provided in the screen of FIG. 4 includes a list of new recordings and "best bets." Best bets may include promotional content, recommended content, or other content that may be determined to be of interest to a user that may not be directly associated with any Watchlist item.

Figure 5:
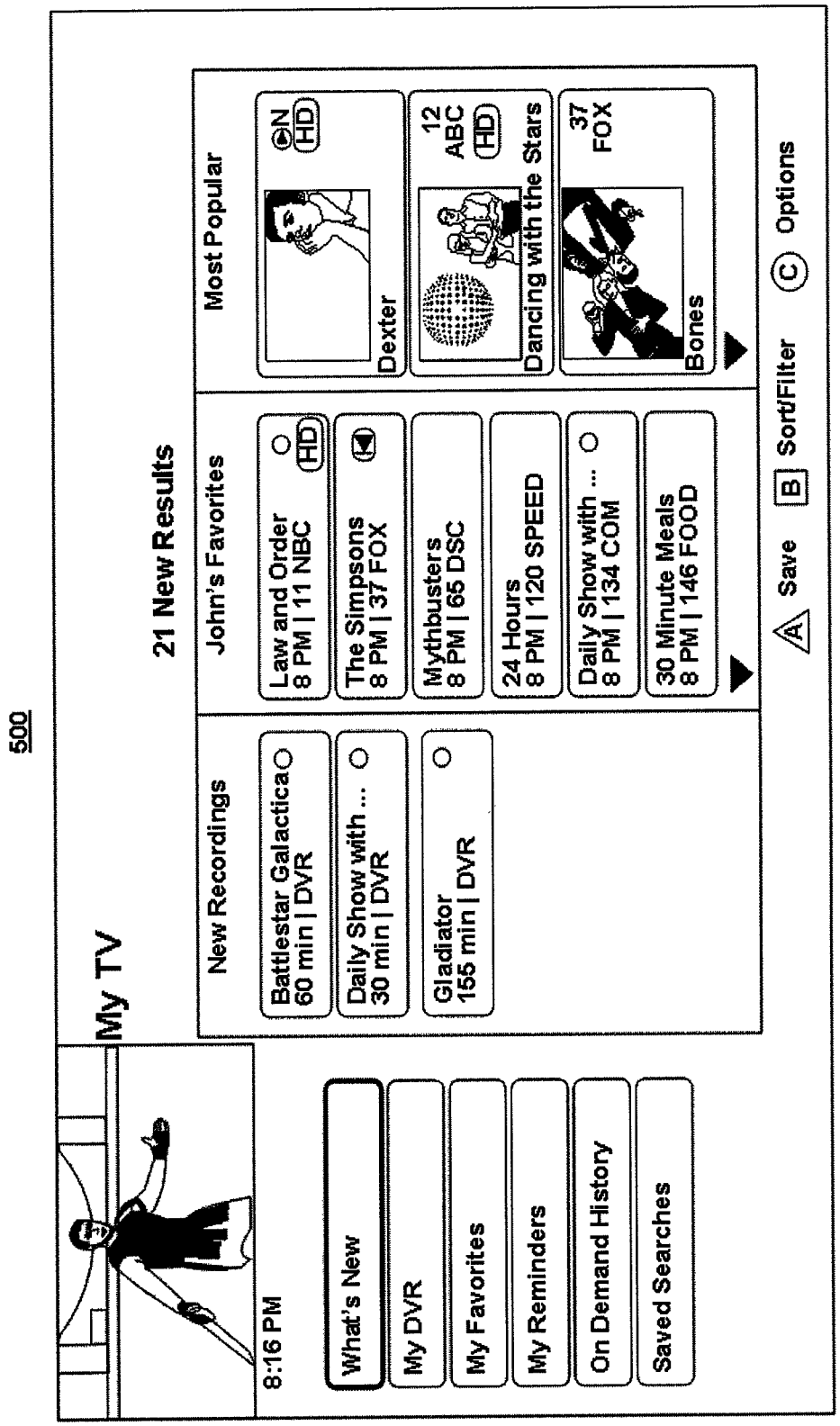
Figure 7:
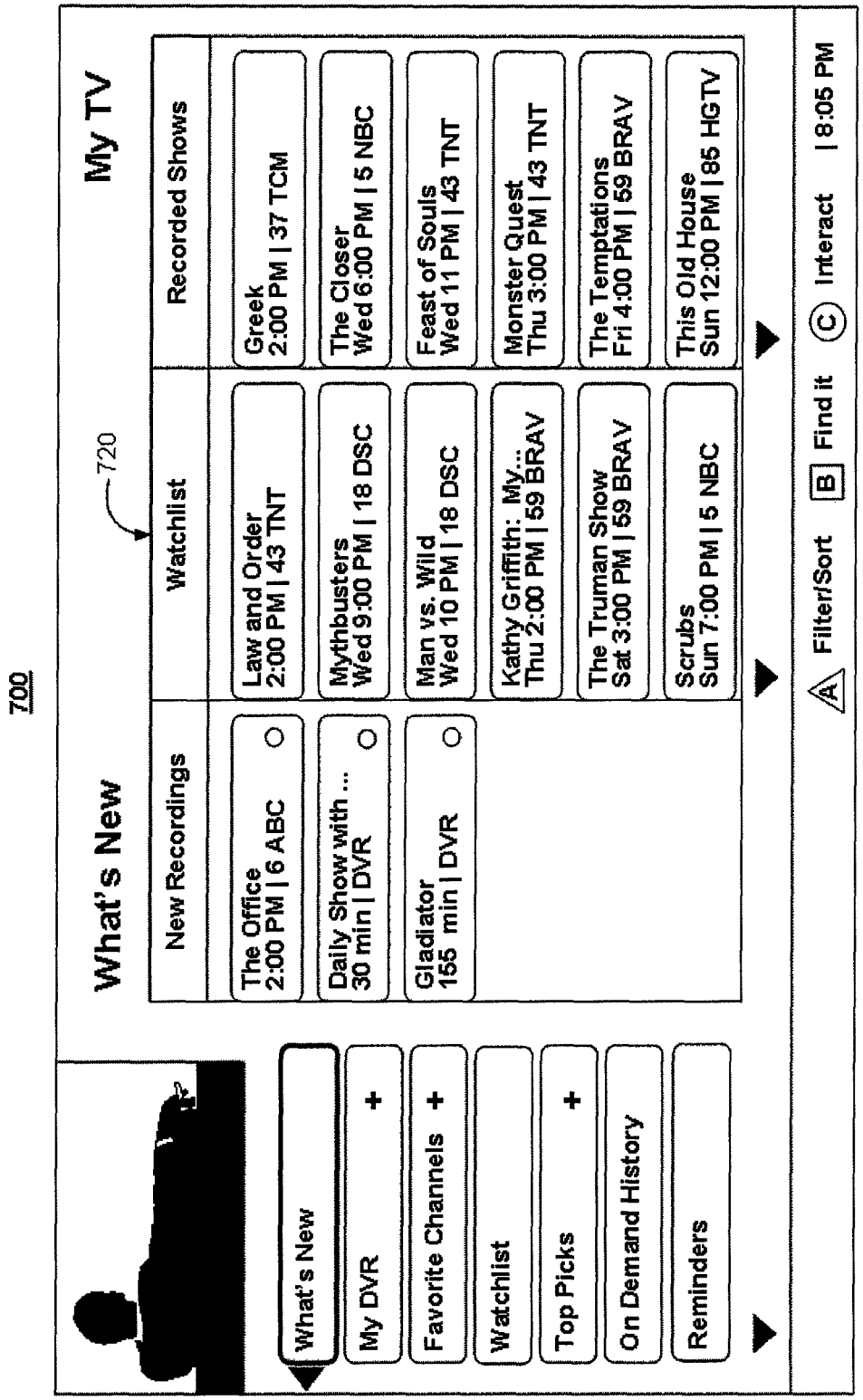
Figure 8:
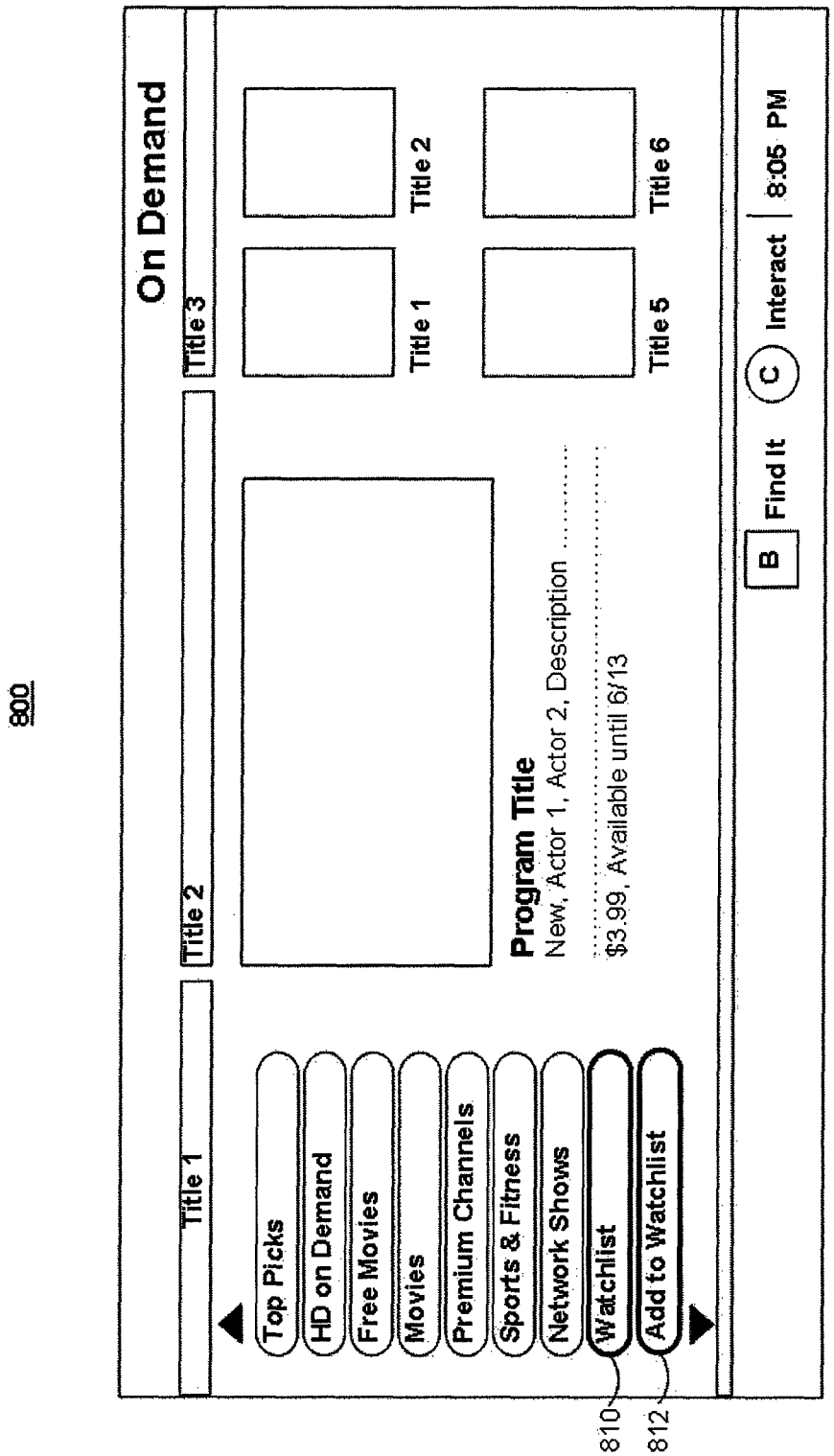
FIG. 8 shows an illustrative screen for on-demand assets in an interactive television guidance application in accordance with an embodiment of the present invention.

In addition to "best bets," other navigation features may also be provided using personalized television screens, such as a "most popular" option as shown in FIG. 5 which may indicate content that is most popular with a given audience, which may be specified by a user, or include elements of the general population of viewers or users. Another navigation feature is provided using alerts, shown in FIG. 6, which may provide alerts generally, or specifically in connection with Watchlist items. FIG. 7 depicts another embodiment of a Watchlist and single media asset cells that includes asset scheduling information.

Figure 12:
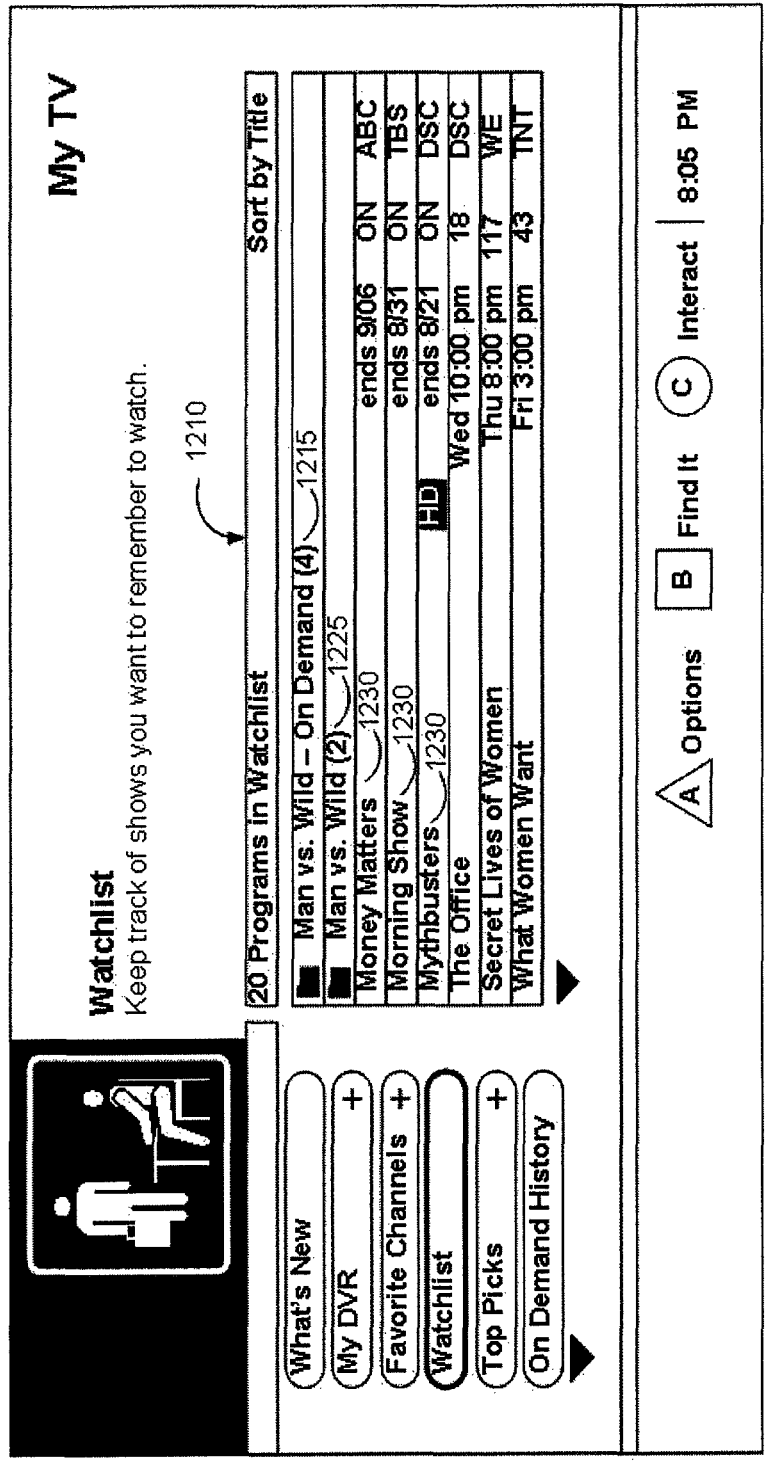
FIGS. 12-13 show illustrative Watchlist screens for an interactive television guidance application in accordance with embodiments of the present invention.

Watchlist screen 1200 depicted in FIG. 12 provides list 1210 of media assets, specifically programs, that a user may wish to watch. At the top of the list is Man vs. Wild 1215 which includes a folder of 4 On Demand episodes. The second item on the list is Man vs. Wild 1225 which includes a folder of 2 items. The items may be any media asset that may be related to Man vs. Wild, such as recordings, news articles, videos, or other asset. Although Man vs. Wild 1215 and 1225 are listed twice in Watchlist 1210, in other embodiments, the assets may also be consolidated in a single line. In addition, although Watchlist 1210 is presented in alphabetical order, prioritization of media assets may be provided so that the top of the Watchlist 1210 may be a high priority asset. Other ordering techniques may also be used to arrange the list of Watchlist assets. Other assets included in Watchlist 1210 may also include several programs 1230 and respective scheduling information. In general, each of the identifiers for assets listed in the Watchlist 1210 cells may be selected using user input device 114 to access the asset or asset information.

Figure 13:
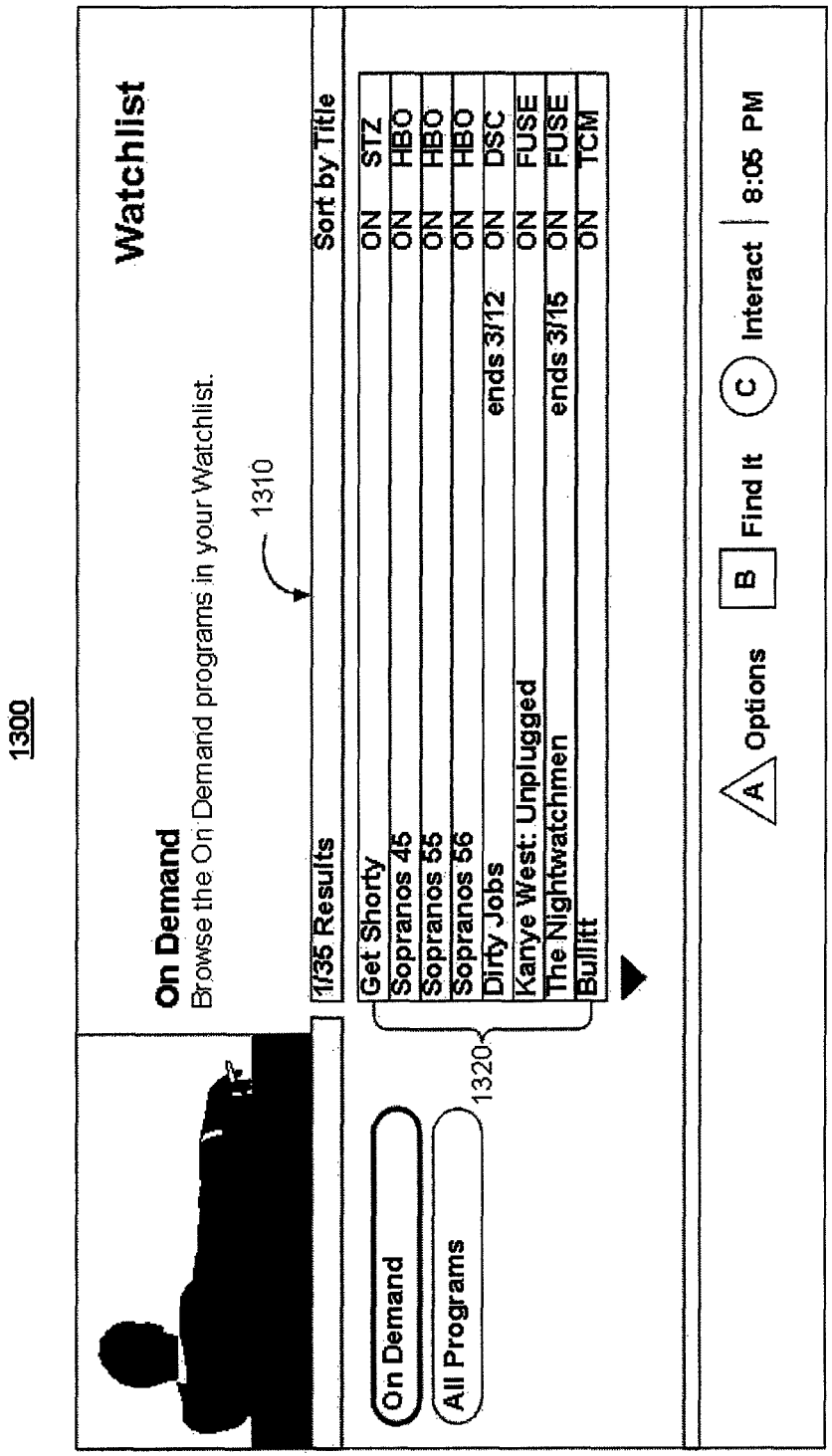

Turning to FIG. 13, Watchlist screen 1300 includes a list 1310 of On Demand assets. Unlike the Watchlist 1210, the assets in Watchlist 1310 are not presented in alphabetical order. The assets 1320 may be listed in an order according to their priority of importance or interest to a user. Priority and ordering for Watchlist 1310 may be based on user preferences input via user input device 114, or based on user viewing history and behavior information stored in database 119. For example, information indicating that a user has viewed certain programs related to a tagged item may cause a new program in the same series to have a relatively high priority. Conversely, information indicating that a user has deleted programs without viewing them may cause a new program in the same series to have a relatively lower priority. Other ordering and prioritization techniques may also be used.

Figure 14:
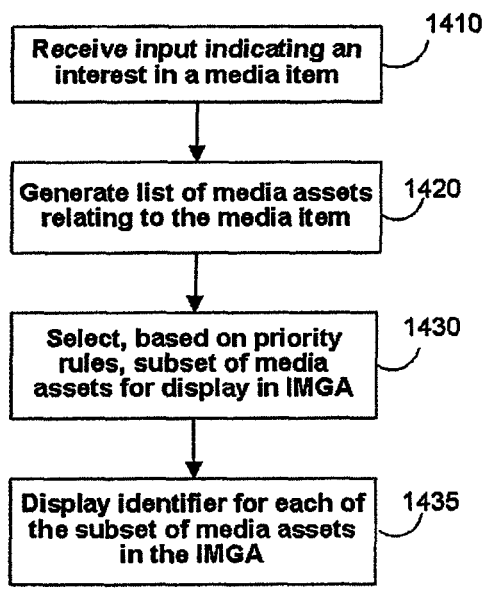
FIGS. 14-15 are illustrative flowcharts for selecting media assets for display in an interactive television guidance application in accordance with embodiment of the present invention.
Figure 15:
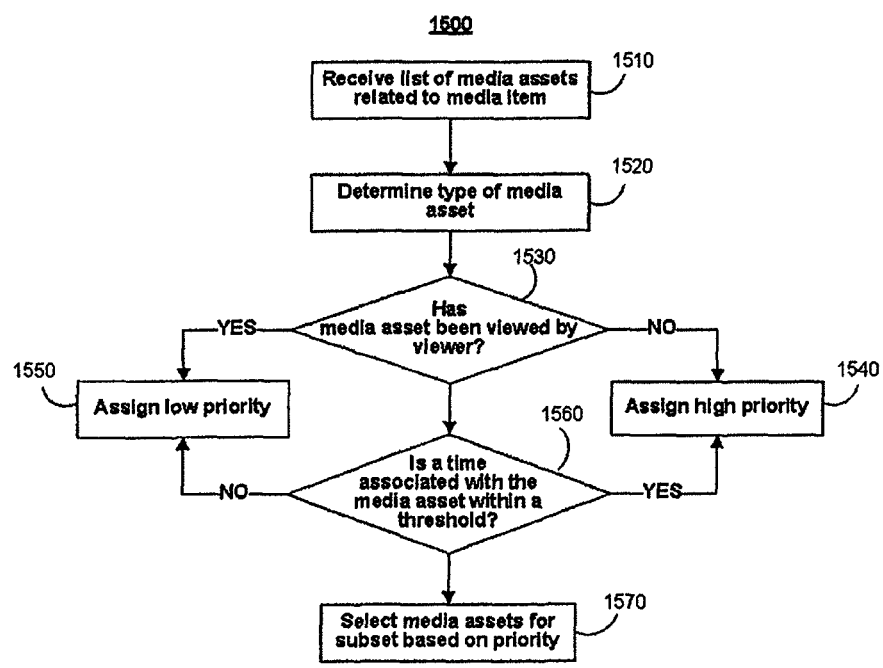

The above described system depicted in FIG. 1 may be used to provide the methods illustrated in the flowcharts of FIGS. 14-15 to provide the screens for embodiments of the interactive media guidance application depicted in FIGS. 2-13. As shown in FIG. 14, a flowchart 1400 of a method is provided for selecting media assets for display in an interactive media guidance application. At step 1410, input may be received indicating an interest in a media item. Step 1410 may be provided by receiving a user providing input via user input device 114 selecting a media item, or by the user tagging a keyword or other item. In other embodiments, step 1410 may be based on information associated with a user viewing history, behavior or preferences information stored, for example in database 119. In some embodiments, interest in a media item is determined based on relevance matching of media assets to items a user has previously expressed interest in.

A list of media assets related to the media items is generated at step 1420. The media assets may be, as discussed above, any type of media content or asset, such as television programs, videos, music, photography, news, games, applications, text, on demand content, recordings, and other assets. The list of media assets related to media items may used as a basis for a Watchlist, such as the Watchlists depicted in FIGS. 3A-4, 7 and 12-13. In some embodiments, the full list of media assets generated at step 1420, which could be lengthy, is not displayed in a screen, in favor of selecting only a subset of media assets for display in the screen of an interactive media guidance application, at step 1430.

In some embodiments, step 1430 may be provided using processing by control circuitry 116 of data items received from data source 124, or stored in memory 117 or database 119, such as media assets listed in step 1420, and based on certain priority rules that may also be stored in database 119 or in memory 117. In general, priority rules may be related to a time component associated with a media asset (e.g., when the media asset is airing in the case of broadcast assets, or when the media will be available (beginning and/or end) in the case of on-demand assets), and whether the media asset has been viewed fully or partially. With respect to games and applications, criteria may include when the application was first made available or when, if or how many times it was played or executed by a user. Such rules are further described with reference to FIG. 15. Following selection of the subset of media assets, at step 1430, an identifier for each of the subset of media assets is displayed in the interactive media guidance application at step 1435.

An example of priority rules discussed in connection with step 1430 is provided below. Assets may be selected for display according to the following priority order:

1. New recordings, if there are unwatched recordings less than 7 days old.
2. Most recent associated asset available On-Demand, if less than 14 days old and unwatched.
3. Next new episode if airing within 7 days.
4. Catch-up option if user has not watched all episodes.

If none of the above, then:

5. Older recordings.
6. New episodes airing more than 7 days later.
7. Assets already watched.

Figure 10:
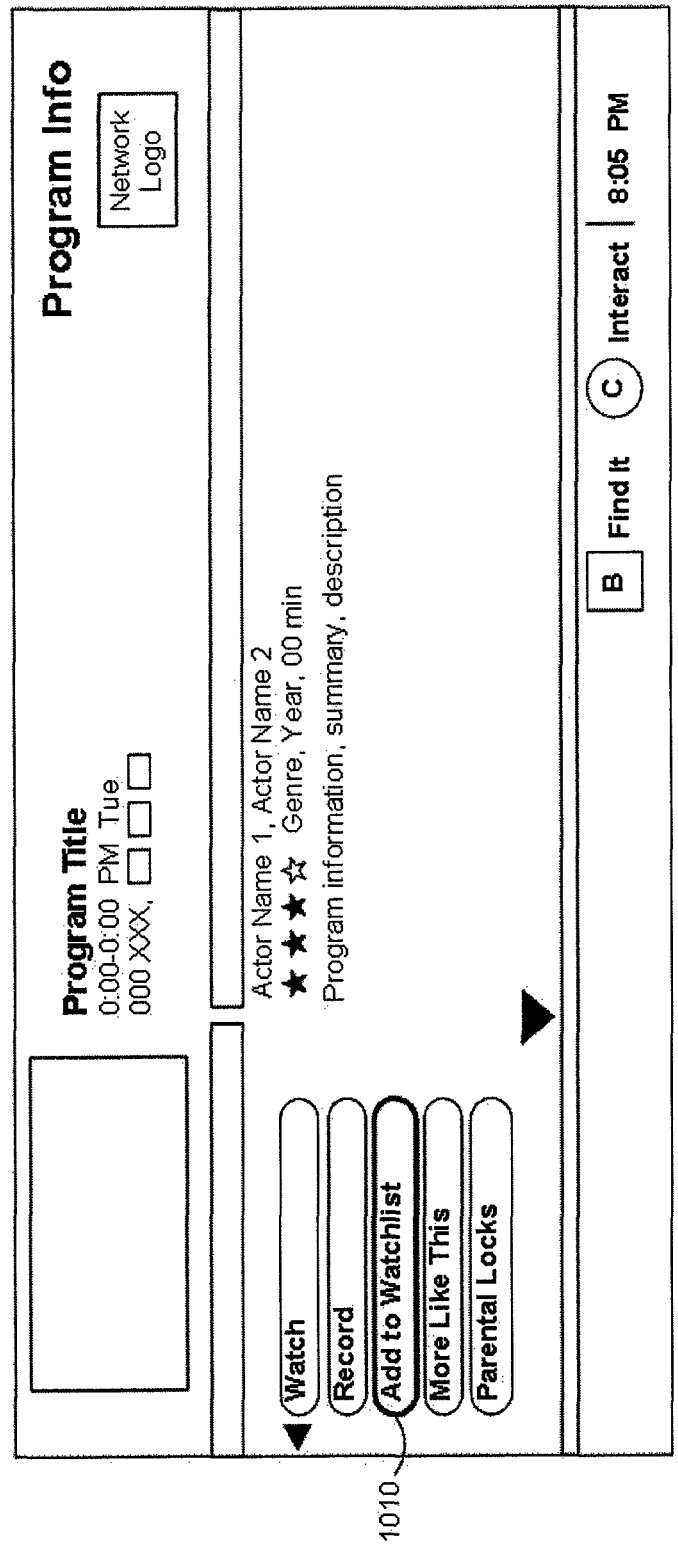
FIG. 10 shows an illustrative program information screen for an interactive television guidance application in accordance with an embodiment of the present invention.
Figure 11:
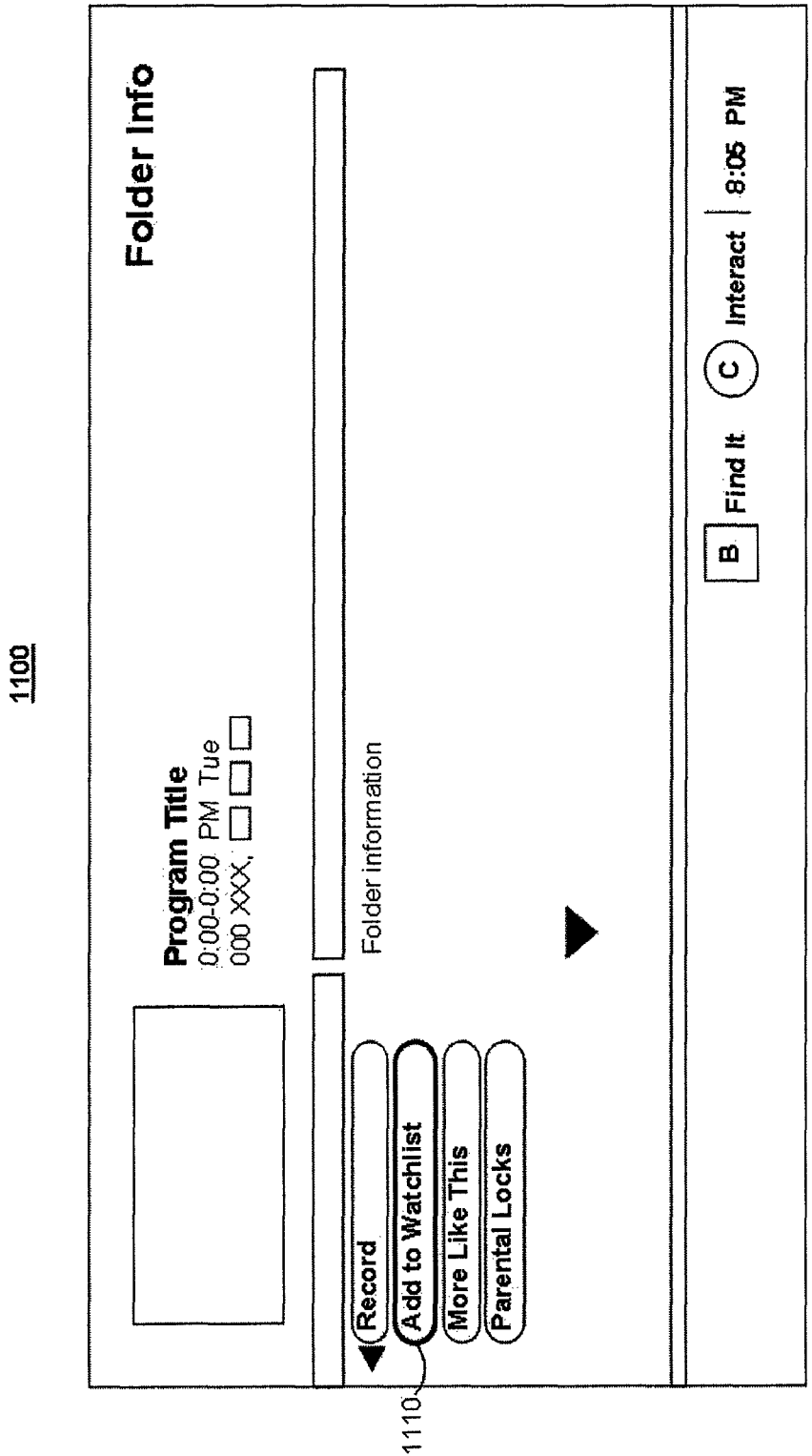
FIG. 11 shows an illustrative folder information screen for an interactive television guidance application in accordance with an embodiment of the present invention.

As would be understood to one skilled in the art, many variations on the above rules are possible while maintaining the spirit of the invention as indicated by the scope of the claims. Generally speaking, in some embodiments, the priority rules may also follow the flowchart 1500 of FIG. 15. As shown in FIG. 15, a list of media assets related to a media item is received at step 1510. The list may be the same as that generated at step 1420. Typically the list of media assets is received at step 1510 by control circuitry 116 and may include a plurality of media assets that are related to a tagged media item. Each of the assets in the received list of media assets may be subject to the steps 1520-1560 for selection in a subset of prioritized assets. At step 1520, the asset type may be determined. The type determination may be performed by control circuitry 116 and typically comprises reviewing program or related information, which may be received from data source 124, or database 119, to identify type information. For example, for a television program, program information (i.e., as shown in FIG. 10) may be stored in database 119 and may include asset type information. In some embodiments, step 1520 may be undertaken to implement different priority rules for different types of assets. For example, on-demand media may have different priority rules than recordings.

At step 1530, a determination is made of whether the media asset has been viewed. This determination may be performed by control circuitry 116 and may include reviewing data for the asset in database 119, recording device 118, and memory 117 to identify information indicating that the asset has been viewed or otherwise consumed by a user. If the asset has not been viewed, a relatively high priority may be assigned to the asset at step 1540. The high priority assignment may be a weighting that is associated with the media asset and stored, in association with the media asset, in memory 117, or database 119. If the asset has been viewed, a relatively lower priority may be assigned to the asset at step 1550 using weighting that is also associated with the media asset and stored in association with the media asset in memory 117 or database 119.

At step 1560 a time associated with the media asset is determined to fall within a threshold range. In general, the threshold range may be established by user preference or in accordance with priority rules. The threshold for time may be related to asset type. For example, an on-demand asset may have a time threshold of 14 days, while a recording may have a time threshold of 7 days. Other thresholds for time and combinations with media type may also be used. Typically a time threshold is stored in memory 117 or database 119 and used by control circuitry 116, together with asset time information, in the determination at step 1560. Asset time information may be obtained, for example, using program information stored in database 119 or obtained from data sources 124. For example, program information depicted in the screen of FIG. 10 includes scheduling time information and a production date. Each of these time elements, or others, may be used for the determination at step 1560. For an asset having an associated time within a threshold, a relatively high priority is assigned at step 1540 and high priority weighting may be stored in association with the asset. Conversely, for an asset having an associated time outside of the threshold, a relatively low priority is assigned at step 1550. Low priority weighting may be stored in association with such asset.

Following completion of step 1560, the control circuitry 116 may select, at step 1570, a subset of certain media assets based on the associated priority weightings which may be obtained by the control circuitry from memory 117 or database 119. The subset of media assets may then be displayed using identifiers for each of the subset of media assets in a screen of the interactive program guidance application.

In an illustrative example that follows the flowcharts of FIGS. 14-15, a user may tag one or more items of interest, such as the keyword name of actor Michael C. Hall and the program title Lost in a guide application using an input device. The tagged items may be stored in memory and used to generate a list of media assets that may form a Watchlist, or alternatively provide the basis for a Watchlist. Examples of lists of media assets may include items relating to Michael C. Hall, such as his shows Dexter, Six Feet Under, news articles, movies, and other assets. Assets relating to Lost may include news articles, music soundtracks from the show, recordings, deleted recordings, viewed episodes, on demand episodes, new episodes, behind the scenes extras, interactive portals, e-commerce opportunities relating to Lost, cast biographies, interactive games related to the content, and other assets.

A subset of the media assets may be selected using priority rules, and may include determining asset types, such as news, on demand items, recordings, or other types. A determination may also be made as to whether the asset has been viewed. For example, if the Lost on-demand episodes have been viewed, they may be considered lower priority and may be relegated to the bottom of the priority order. If the Lost new episodes and recordings have not been viewed, such assets may receive a higher priority weighting.

A time associated with the asset may be obtained by considering asset information, such as program information, asset metadata, or other source of information for an asset. The time associated with the asset may be compared to a time threshold for an asset type. At one extreme, old content, such as last season's Lost on-demand episodes that may exceed the time threshold, may be assigned a low weighting, while at the other extreme, new on-demand Lost episodes and recently aired first run recordings of Lost within the time threshold may be assigned a high weighting. Some of the prioritization may be established by set rules, in other embodiments by a user preference, history or behavior. The higher priority assets may be selected for display in a screen, such as a Watchlist screen of some embodiments of the interactive media guidance application.

The above described embodiments of the present invention are presented for purposes of illustration and not of limitation, and the present invention is limited only by the claims which follow.

What is claimed is:

1. A method of selecting assets for display in an interactive media guidance application, the method comprising:
   receiving, from a user, an input indicating an interest in a media item;
   generating a list of media assets related to the media item, wherein the media assets comprise at least an on-demand media asset and a recorded media asset;
   selecting, based on priority rules, a subset of the media assets in the list to display in an interactive media guidance application,
   wherein the priority rules assign, without user input, a first priority to the on-demand media asset, and a second priority to the recorded media asset, and wherein the priority rules are based at least in part on: (1) whether the media asset has been viewed by the user, and (2) a respective time associated with the media asset; and
   displaying an identifier for each of the subset of media assets in the interactive media guidance application screen.

2. The method of claim 1 wherein the subset of media assets is displayed in an order determined by the priority rules.

3. The method of claim 1 wherein the priority rules are further based, in part, on at least one of the group of: a user preference, a user history, a user device type, a priority order for an asset type, and episode catch-up.

4. The method of claim 1 further comprising selecting some of the subset of media assets for display based on an available area in the interactive media guidance application screen.

5. The method of claim 1 wherein the subset of media assets are logically grouped by a category for display in the interactive media guidance application screen.

6. The method of claim 5 further comprising selecting some of the subset of media assets for display based on an available area in the interactive media guidance application screen.

7. The method of claim 1 wherein the media assets comprise one of the group of: new recordings, old recordings, recent associated content, on demand content, episode catch-up, next new episode, viewed content, photographs, music content, games, next game, missed games, linear showings, extra scenes, interactive portals, shopping, music videos, music files, news, biographical information, and sports statistics.

8. The method of claim 1 wherein the user input comprises tagging.

9. The method of claim 1 wherein the user input is based on a user's viewing history.

10. The method of claim 1 wherein the media items comprise at least one of the group of: actor, music group, sports team, movie, program, celebrity, director, and individual.

11. The method of claim 1 further comprising determining that the subset of the media assets are included a user's service package.

12. The method of claim 1 further comprising providing an up sell option for any media assets that are determined to be excluded from the user's service package.

13. A system comprising user equipment for implementing an interactive media guidance application, the user equipment operative to:

receive, from a user, an input indicating an interest in a media item;

generate a list of media assets related to the media item, wherein the media assets comprise at least an on-demand media asset and a recorded media asset;

select, based on priority rules, a subset of the media assets in the list to display in an interactive media guidance application, wherein the priority rules assign, without user input, a first priority to the on-demand media asset, and a second priority to the recorded media asset, and wherein the priority rules are based at least in part on: (1) whether the media asset has been viewed by the user, and (2) a respective time associated with the media asset; and display an identifier for each of the subset of media assets in the interactive media guidance application screen.

14. The system of claim 13 wherein the subset of media assets is displayed in an order determined by the priority rules.

15. The system of claim 13 wherein the priority rules are further based, in part, on at least one of the group of: a user preference, a user history, a user device type, a priority order for an asset type, and episode catch-up.

16. The system of claim 13 wherein the user equipment is operative to: select some of the subset of media assets for display based on an available area in the interactive media guidance application screen.

17. The system of claim 13 wherein the subset of media assets are logically grouped by a category for display in the interactive media guidance application screen.

18. The system of claim 17 wherein the user equipment is operative to: select some of the subset of media assets for display based on an available area in the interactive media guidance application screen.

19. The system of claim 13 wherein the media assets comprise one of the group of: new recordings, old recordings, recent associated content, on demand content, episode catch-up, next new episode, viewed content, photographs, music content, games, next game, missed games, linear showings, extra scenes, interactive portals, shopping, music videos, music files, news, biographical information, and sports statistics.

20. The system of claim 13 wherein the user input comprises tagging.

21. The system of claim 13 wherein the user input is based on a user's viewing history.

22. The system of claim 13 wherein the media items comprise at least one of the group of: actor, music group, sports team, movie, program, celebrity, director, and individual.

23. The system of claim 13 wherein the user equipment is operative to: determine that the subset of the media assets are included a user's service package.

24. The system of claim 13 wherein the user equipment is operative to: provide an up sell option for any media assets that are determined to be excluded from the user's service package.

* * * * *